3,117,113
ANTISTATIC COMPOSITION
Richard Tudor, Burton-on-Trent, England, assignor to BTR Industries Ltd., London, England
No Drawing. Filed Aug. 15, 1958, Ser. No. 755,126
Claims priority, application Great Britain Aug. 22, 1957
10 Claims. (Cl. 260—92.8)

This invention relates to a vinyl chloride polymer composition and pertains more particularly to a vinyl chloride polymer composition having sufficient electrical-conductivity to prevent the accumulation of an electrostatic charge thereon of such magnitude that the charge is liable to be dissipated in the form of a spark discharge.

For many applications for which vinyl chloride polymer compositions are useful, it is desirable that the composition be sufficiently electrical-conductive so that static electricity gathered by the composition is dissipated from the composition as the charge is formed and is not permitted to accumulate. For example, many people who must work with or close to highly combustible materials consider it essential to wear shoes which are electrical-conductive to lessen the danger of explosion caused by discharge of static electricity in the form of a spark discharge. Electrical-conductive vinyl chloride polymer compositions also would be useful in hose used for transferring combustible materials, in conveyor belting, floor tile, upholstery materials, and in many other products where the accumulation of static electricity is objectionable. In fact, since electrostatic charges tend to attract dust, lint and other foreign matter suspended in the air, it is desirable to employ electrical-conductive vinyl chloride polymer compositions for all applications for which vinyl chloride polymer compositions are used.

It has been proposed to add electrical-conductive carbon black to vinyl chloride polymer compositions to render the compositions sufficiently electrical-conductive to dissipate static electricity as it is formed on the compositon. The use of such carbon blacks, however, has the disadvantage that the vinyl chloride polymer composition and products made thereof are necessarily black in color. To overcome this color disadvantage, it has been proposed to add to the vinyl chloride polymer composition, in place of electrical-conductive carbon black, various light-colored materials which will improve the electrical-conductivity of the composition. However, the light-colored materials heretofore proposed for this purpose have not proven to be completely satisfactory, since when using these materials it has been found to be difficult to impart, consistently, sufficient electrical-conductivity to the vinyl chloride polymer composition to prevent the accumulation of static electricity.

It now has been found that a vinyl chloride polymer composition can be rendered sufficiently electrical-conductive, so that static electricity is dissipated from the composition as the charge is formed, rather than accumulating and being dissipated as a spark discharge, by mixing into the vinyl chloride polymer composition one or more materials from a specific class of cationic surface active agents. In accordance with this invention, one or more organic quaternary ammonium salts of the formula

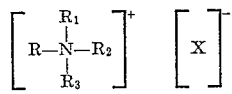

where R is an alkyl radical having 12 to 18 carbon atoms, $R_1$, $R_2$ and $R_3$ are alkyl and/or aryl radicals, and X is an alkyl sulfate radical (preferably ethyl sulfate) are incorporated into the vinyl chloride polymer composition. The following organic quaternary ammonium salts are illustrative of the class of quaternary ammonium salts useful in this invention:

Octadecyl dimethyl ethyl ammonium ethyl sulfate
Lauryl dimethyl ethyl ammonium ethyl sulfate
Myristyl dimethyl ethyl ammonium ethyl sulfate
Stearin dimethyl ethyl ammonium ethyl sulfate
Olein dimethyl ethyl ammonium ethyl sulfate
Cetyl dimethyl ethyl ammonium ethyl sulfate
Distearin methyl ethyl ammonium ethyl sulfate
Stearyl dimethyl ethyl ammonium ethyl sulfate
Oleyl dimethyl ethyl ammonium ethyl sulfate
Dioleyl methyl ethyl ammonium ethyl sulfate
Diluaryl methyl ethyl ammonium ethyl sulfate
Distearyl methyl ethyl ammonium ethyl sulfate
Octadecyl dimethyl ethyl ammonium methyl sulfate
Dicetyl methyl ethyl ammonium methyl sulfate
Lauryl dimethyl benzyl ammonium propyl sulfate
Olein methyl diethyl ammonium butyl sulfate The amount of these quaternary ammonium salts added to the vinyl chloride polymer composition will vary depending upon the specific polymer composition being used and the degree of electrical-conductivity desired. Normally, the amount of the quaternary ammonium salt used in practicing this invention need not exceed 5 parts by weight based upon 100 parts by weight of the vinyl chloride polymer, from 2 to 5 parts by weight of the quaternary ammonium salt based upon 100 parts by weight of the vinyl chloride polymer being preferred.

The quaternary ammonium salts defined by the above formula are useful for rendering any vinyl chloride polymer electrical-conductive. For example, these quaternary ammonium salts may be mixed with polyvinyl chloride polymer (a homopolymer of vinyl chloride) or copolymers of vinyl chloride with vinylidene chloride, vinyl acetatae or ethyl maleate. In addition to the quaternary ammonium salt, the vinyl chloride polymer composition may contain plasticizers, stabilizers, fillers, colorants, and other modifying agents. Plasticizers for vinyl chloride polymers are well known and include dioctyl phthalate, butyl decyl phthalate, didecyl phthalate, dioctyl adipate, dioctyl sebacate, tricresyl phosphate, trioctyl phosphate, and acetyl tributyl citrate. A blend of different vinyl chloride polymers may be used in the composition.

If desired, non-ionic surface active agents which are known to render vinyl chloride polymers more electrical-conductive may be added to the vinyl chloride polymer composition in addition to the quaternary ammonium salts useful in practicing this invention. Such non-ionic surface active agents include the condensation products obtained by the interaction of from 2 to 3 mols of ethylene oxide with 1 mol of a fatty alcohol having from 6 to 20 carbon atoms, such as hexyl alcohol, decyl alcohol, lauryl alcohol, myristic alcohol, cetyl alcohol, stearyl alcohol and eicosyl alcohol, and the condensation products, preferably those which are liquid at room temperature (20–25° C.), obtained by the interaction of polyethylene glycol, preferably having a molecular weight from about 200 to 400, with a fatty alcohol having from 6 to 20 carbon atoms. It has been found that the use of these non-ionic surface active agents in conjunction with the quaternary ammonium salts defined as being useful in this invention impart a higher degree of electrical-conductivity to the vinyl chloride polymer composition than when either the non-ionic surface active agent or quaternary ammonium salt is used alone and, in addition, renders the vinyl chloride polymer composition more flexible at lower temperatures than when either the non-ionic surface active agent or quaternary ammonium salt is used alone. When a non-ionic surface active agent is added to the vinyl chloride polymer composition, up to 30 parts by weight of such non-ionic surface active agent based upon 100 parts by weight of vinyl chloride polymer may be used, although from 5 to 10 parts by weight of the non-ionic surface active agent based upon 100 parts by weight of vinyl chloride polymer preferably is used.

The following examples are intended merely to illustrate the invention, and should not be construed as limiting this invention to these specific illustrations.

*Example I*

| Material: | Parts by weight |
|---|---|
| Polyvinyl chloride | 100.0 |
| Trixylenyl phosphate | 70.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Octadecyl dimethyl ethyl ammonium ethyl sulfate | 4.5 |

The materials were mixed together and gelled on hot rolls at about 300° F. in the usual manner and the resulting composition was molded in a press at 300° F. in the usual manner to form a sheet 0.060 inch thick. The molded sheet was maintained at a constant temperature (70° F.) and humidity (65% R.H.) for 48 hours and was found to have an electrical-resistivity of $1.9 \times 10^8$ ohms and was capable of dissipating static electricity as it was formed thereon.

*Example II*

| Material: | Parts by weight |
|---|---|
| Polyvinyl chloride | 100.0 |
| Trixylenyl phosphate | 70.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Octadecyl dimethyl ethyl ammonium ethyl sulfate | 2.0 |

The materials were mixed together, formed into a sheet 0.060 inch thick, and the electrical-resistivity of the molded sheet measured as described in Example I. The electrical-resistivity of the molded sheet was $3.9 \times 10^8$ ohms, and the molded sheet was capable of dissipating static electricity as it was formed thereon.

*Example III*

| Materials: | Parts by weight |
|---|---|
| Polyvinyl chloride | 100.0 |
| Trixylene phosphate | 70.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Lauryl dimethyl ethyl ammonium ethyl sulfate | 2.0 |

The materials were mixed together, formed into a sheet 0.060 inch thick, and the electrical-resistivity of the molded sheet measured as described in Example I. The electrical-resistivity of the molded sheet was $2.6 \times 10^8$ ohms, and the molded sheet was capable of dissipating static electricity as it was formed thereon.

*Example IV*

| Materials: | Parts by weight |
|---|---|
| Polyvinyl chloride | 100.0 |
| Trixylene phosphate | 70.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Distearin methyl ethyl ammonium ethyl sulfate | 2.0 |

The materials were mixed together, formed into a sheet 0.060 inch thick, and the electrical-resistivity of the molded sheet measured as described in Example I. The electrical-resistivity of the molded sheet was $6.6 \times 10^8$ ohms, and the molded sheet was capable of dissipating static electricity as it was formed thereon.

*Example V*

| Materials: | Parts by weight |
|---|---|
| Polyvinyl chloride | 100.0 |
| Trixylene phosphate | 70.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Cetyl dimethyl ethyl ammonium ethyl sulfate | 4.0 |

The materials were mixed together, formed into a sheet 0.060 inch thick, and the electrical-resistivity of the molded sheet measured as described in Example I. The electrical-resistivity of the molded sheet was $1.8 \times 10^8$ ohms, and the molded sheet was capable of dissipating static electricity as it was formed thereon.

*Example VI*

| Materials: | Parts by weight |
|---|---|
| Vinyl chloride-vinylidene chloride copolymer | 100.0 |
| Dioctyl phthalate | 80.0 |
| Lauryl dimethyl ethyl ammonium ethyl sulfate | 4.5 |

The materials were mixed together and formed into a sheet as described in Example I, and the molded sheet was capable of dissipating static electricity as it was formed thereon.

*Example VII*

| Materials: | Parts by weight |
|---|---|
| Vinyl chloride-ethyl maleate copolymer | 100.0 |
| Diisooctyl phthalate | 70.0 |
| Cetyl dimethyl ethyl ammonium ethyl sulfate | 3.5 |

The materials were mixed together and formed into a sheet as described in Example I, and the molded sheet was capable of dissipating static electricity as it was formed thereon.

*Example VIII*

| Materials: | Parts by weight |
|---|---|
| Vinyl chloride-vinyl acetate copolymer | 100.0 |
| Diisooctyl phthalate | 80.0 |
| Lauryl dimethyl ethyl ammonium ethyl sulfate | 4.0 |

The materials were mixed together and formed into a sheet as described in Example I, and the molded sheet was capable of dissipating static electricity as it was formed thereon.

*Example IX*

| Materials: | Parts by weight |
|---|---|
| Polyvinyl chloride | 100.0 |
| Trixylenyl phosphate | 65.0 |
| Dialphanyl phthalate | 35.0 |
| White lead carbonate paste (80% white lead carbonate and 20% dioctyl phthalate) | 5.0 |
| Lead stearate paste (67% lead stearate and 33% dioctyl phthalate) | 2.0 |
| Polyethylene glycol 200 laurate (condensation product of 200 M.W. polyethylene and lauryl alcohol) | 5.0 |
| Octadecyl dimethyl ethyl ammonium ethyl sulfate | 2.0 |

The materials were mixed together on hot rolls in the usual way and was employed as the cover (0.045 inch thick) of a five-ply conveyor belt. The electrical-resistivity of the composition was $8.7 \times 10^7$ ohms.

Vinyl chloride polymer compositions containing one or more of the quaternary ammonium salts useful in this invention may be used in the manufacture of any vinyl chloride polymer product. For example, vinyl chloride polymer compositions within the purview of this invention may be used in conveyor belting, the composition being used as the cover composition and/or as the interply composition and/or for impregnating fabric reinforcing plies in the belt. Suitable vinyl chloride polymer compositions for these purposes are as follows:

| Materials | Parts by Weight | |
|---|---|---|
| | For Cover and Interplies | For Impregnation of Fabric Plies |
| Polyvinyl chloride | 100.0 | 100.0 |
| Trixylenyl phosphate | 70.0 | 150.0 |
| Dialphanyl phthalate | | 35.0 |
| White lead carbonate paste (80% white lead carbonate and 20% dioctyl phthalate) | 5.0 | 5.0 |
| Lead stearate paste (67% lead stearate and 33% dioctyl phthalate) | | 2.0 |
| Polyethylene glycol 200 laurate (condensation product of 200 M.W. polyethylene and lauryl alcohol) | 2.0 | 2.0 |
| Octadecyl dimethyl ethyl ammonium ethyl sulfate | 2.0 | 2.0 |

It is clear that obvious modifications and variations of this invention may be made without departing from the scope of the invention as defined in the appended claims.

I claim:

1. A composition of matter comprising a vinyl chloride polymer and an antistatic amount of a quaternary ammonium salt having the empirical formula

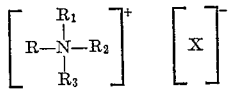

where R is an alkyl radical having 12 to 18 carbon atoms, $R_1$ and $R_2$ are alkyl radicals having 1 to 2 carbon atoms, $R_3$ is a radical selected from the group consisting of alkyl radicals having 1 to 18 carbon atoms and aryl radicals having 1 to 7 carbon atoms, and X is an alkyl sulfate radical having 1 to 4 carbon atoms.

2. A composition of matter comprising a vinyl chloride polymer and an antistatic amount of a quaternary ammonium salt having the empirical formula

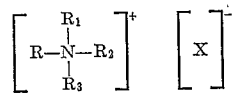

where R is an alkyl radical having 12 to 18 carbon atoms, $R_1$ and $R_2$ are alkyl radicals having 1 to 2 carbon atoms, $R_3$ is a radical selected from the group consisting of alkyl radicals having 1 to 18 carbon atoms and aryl radicals having 1 to 7 carbon atoms, and X is the anion ethyl sulfate.

3. A composition of matter comprising a vinyl chloride polymer and an antistatic amount of a quaternary ammonium salt having the empirical formula

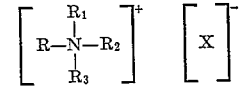

where R is an alkyl radical having 12 to 18 carbon atoms, $R_1$ and $R_2$ are alkyl radicals having 1 to 2 carbon atoms, $R_3$ is an alkyl radical having 1 to 18 carbon atoms, and X is an alkyl sulfate radical having 1 to 4 carbon atoms.

4. A composition of matter comprising (1) a vinyl chloride polymer, (2) an antistatic amount of a quaternary ammonium salt having the empirical formula

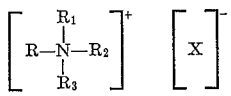

where R is an alkyl radical having 12 to 18 carbon atoms, $R_1$ and $R_2$ are alkyl radicals having 1 to 2 carbon atoms, $R_3$ is an alkyl radical having 1 to 18 carbon atoms, and X is an alkyl sulfate radical having 1 to 4 carbon atoms, and (3) a non-ionic surface active agent selected from the group consisting of condensation products obtained by the interaction of from 2 to 3 mols of ethylene oxide with 1 mol of fatty alcohol having from 6 to 20 carbon atoms and condensation products obtained by the interaction of polyethylene glycol with a fatty alcohol having from 6 to 20 carbon atoms.

5. A composition of matter comprising a vinyl chloride polymer and from 2 to 5 parts by weight per 100 parts by weight of the said vinyl chloride polymer of a quaternary ammonium salt having the empirical formula

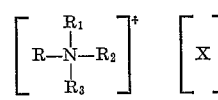

where R is an alkyl radical having 12 to 18 carbon atoms, $R_1$ and $R_2$ are alkyl radicals having 1 to 2 carbon atoms, $R_3$ is an alkyl radical having 1 to 18 carbon atoms, and X is an alkyl sulfate radical having 1 to 4 carbon atoms.

6. A composition of matter comprising a vinyl chloride polymer and from 2 to 5 parts by weight per 100 parts by weight of the said vinyl chloride polymer of octadecyl dimethyl ethyl ammonium ethyl sulfate.

7. A composition of matter comprising a vinyl chloride polymer and from 2 to 5 parts by weight per 100 parts by weight of the said vinyl chloride polymer of lauryl dimethyl ethyl ammonium ethyl sulfate.

8. A composition of matter comprising a vinyl chloride polymer and from 2 to 5 parts by weight per 100 parts by weight of the said vinyl chloride polymer of myristyl dimethyl ethyl ammonium ethyl sulfate.

9. A composition of matter comprising a vinyl chloride polymer and from 2 to 5 parts by weight per 100 parts by weight of the said vinyl chloride polymer of cetyl dimethyl ethyl ammonium ethyl sulfate.

10. A composition of matter comprising a vinyl chloride polymer and from 2 to 5 parts by weight per 100 parts by weight of the said vinyl chloride polymer of olein dimethyl ethyl ammonium ethyl sulfate.

References Cited in the file of this patent

UNITED STATES PATENTS

| 2,579,375 | Eisen | Dec. 18, 1951 |
| 2,683,101 | Riley et al. | July 6, 1954 |
| 2,695,270 | Jefferson et al. | Nov. 23, 1954 |

FOREIGN PATENTS

| 757,119 | Great Britain | Sept. 12, 1956 |
| 775,976 | Great Britain | May 29, 1957 |
| 793,934 | Great Britain | Apr. 23, 1958 |
| 793,935 | Great Britain | Apr. 23, 1958 |